United States Patent
Park et al.

(10) Patent No.: US 9,150,169 B2
(45) Date of Patent: Oct. 6, 2015

(54) METHOD AND SYSTEM FOR DIAGNOSING FAILURE OF OIL PRESSURE SENSOR

(71) Applicants: Hyundai Motor Company, Seoul (KR); Kia Motors Corporation, Seoul (KR)

(72) Inventors: Joonyoung Park, Seoul (KR); Dong Ho Yang, Gyeongsangnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 96 days.

(21) Appl. No.: 13/959,010

(22) Filed: Aug. 5, 2013

(65) Prior Publication Data

US 2014/0148991 A1 May 29, 2014

(30) Foreign Application Priority Data

Nov. 26, 2012 (KR) .................. 10-2012-0134728

(51) Int. Cl.
*G01R 31/00* (2006.01)
*G01R 31/28* (2006.01)
*B60R 16/023* (2006.01)
*F02D 41/22* (2006.01)
*B62D 5/06* (2006.01)
*F02B 37/00* (2006.01)

(52) U.S. Cl.
CPC .......... *B60R 16/0232* (2013.01); *F02D 41/222* (2013.01); *B62D 5/06* (2013.01); *F02B 37/00* (2013.01)

(58) Field of Classification Search
CPC ......... F02D 41/222; F02B 37/00; B62D 5/06; B01D 53/90
USPC ............... 701/114, 108, 31.1; 73/114.37
See application file for complete search history.

(56) References Cited

U.S. PATENT DOCUMENTS

| 5,617,337 | A | * | 4/1997 | Eidler et al. .................. 702/104 |
| 5,808,189 | A | * | 9/1998 | Toyoda ....................... 73/114.37 |
| 6,012,541 | A | * | 1/2000 | Nishioka et al. .............. 180/404 |
| 6,785,604 | B2 | * | 8/2004 | Jacobson ...................... 701/114 |
| 6,837,214 | B2 | * | 1/2005 | Doelker et al. .............. 123/329 |
| 6,850,833 | B1 | * | 2/2005 | Wang et al. .................. 701/108 |
| 6,898,511 | B2 | * | 5/2005 | Denz et al. ................... 701/114 |

(Continued)

FOREIGN PATENT DOCUMENTS

| JP | 2001-173507 A | 6/2001 |
| JP | 2004011869 A | 1/2004 |

(Continued)

*Primary Examiner* — Thomas G Black
*Assistant Examiner* — Wae Louie
(74) *Attorney, Agent, or Firm* — Mintz Levin Cohn Ferris Glovsky and Popeo, P.C.

(57) ABSTRACT

A method and a system that diagnose failure of an oil pressure sensor that senses or detects an operating oil pressure in a target device (e.g., a hydraulic clutch) using oil pressure. The method includes a controller that is configured to store an ignition off time that an ignition is turned off and detect an ignition on time that the ignition is turned on after the ignition has been turned off. In addition, the controller is configured to calculate an elapsed time from the ignition off time to the ignition on time and determine whether the elapsed time is equal to or greater than a predetermined time. When the elapsed time is equal to or greater than the predetermined time the controller is configured to diagnose oil pressure sensor failure and when the elapsed time is less than the predetermined time, stop diagnosing failure of the oil pressure sensor.

15 Claims, 6 Drawing Sheets

(56) References Cited

U.S. PATENT DOCUMENTS

| | | | |
|---|---|---|---|
| 7,134,413 B2 * | 11/2006 | Cho | 123/179.17 |
| 7,197,917 B2 * | 4/2007 | Hasegawa | 73/114.37 |
| 7,243,021 B2 * | 7/2007 | Hasegawa | 701/114 |
| 8,176,726 B2 * | 5/2012 | Gerlach | 60/277 |
| 2014/0148991 A1 * | 5/2014 | Park et al. | 701/31.1 |

FOREIGN PATENT DOCUMENTS

| | | |
|---|---|---|
| JP | 4186258 B2 | 11/2008 |
| KR | 10-2012-0050846 | 5/2012 |

* cited by examiner

METHOD AND SYSTEM FOR DIAGNOSING FAILURE OF OIL PRESSURE SENSOR

CROSS-REFERENCE TO RELATED APPLICATION

This application claims priority to and the benefit of Korean Patent Application No. 10-2012-0134728 filed in the Korean Intellectual Property Office on Nov. 26, 2012, the entire contents of which are incorporated herein by reference.

BACKGROUND OF THE INVENTION (a) Field of the Invention

The present invention relates to a method and a system that diagnoses failure of an oil pressure sensor that senses or detects an operating oil pressure in a device (e.g., a hydraulic clutch) using oil pressure.

(b) Description of the Related Art

In general, a transmission, a clutch, and the like are apparatuses that use oil pressure or hydraulic pressure, in which an oil pressure sensor that senses or detects the oil pressure is installed. The transmission, the clutch, and the like are typically applied to a hybrid vehicle as well as a general vehicle.

The hybrid vehicle uses a motor as a power source, as well as an engine. In the hybrid vehicle 1, as illustrated in FIG. 1, an engine 10, a motor 20, and a transmission 40 may be arranged in series. The hybrid vehicle 1 may include an integrated starter-generator (ISG) 70 and an engine clutch 30. The ISG 70 starts the engine 10 or generates electric power by torque of the engine 10, and the engine clutch 30 controls power transmission between the engine 10 and the motor 20. The engine clutch 30 is an element of the hybrid vehicle that is designed to efficiently combine and use power of the engine 10 and the motor 20.

FIG. 2 is a configuration diagram illustrating a typical engine clutch. As illustrated in FIG. 2, the engine clutch 30 may include a friction material 36 moving via pressure by a fluid (e.g., oil) 34 of which a quantity is controlled by operation of an oil pump 50 (or a solenoid valve), and a return spring 32 that restores the friction material 36 to an original state when an operating pressure is not applied to the friction material 36. The oil pump 50 is generally controlled by an applied voltage and/or current. Oil pressure applied to the engine clutch 30 by the oil pump 50 may be detected by an oil pressure sensor 80.

However, as illustrated in FIG. 3, a difference, that is, an error, may exist between an actual pressure detected by the oil pressure sensor 80 and an ideal pressure that corresponds to a voltage applied to the oil pump 50. In the error illustrated in FIG. 3, an offset error, a gain error, and a linearity error may be included. Since the oil pressure detected by the oil pressure sensor 80 is used in controlling the engine clutch 30, when the error as described exceeds a predetermined value guaranteed by oil pressure sensor manufacturers, the oil pressure sensor 80 may be determined to have failed.

When the oil pressure sensor has been determined to have failed, a warning lamp may be turned on to inform a driver of the oil pressure sensor failure and replacement necessity thereof. Accordingly, even when a command for supplying oil pressure does not exist, when the oil pressure sensor 80 detects a pressure that exceeds the guaranteed offset error range set by the oil pressure sensor manufacturers, the oil pressure sensor 80 may be determined to have failed.

In the related art, to determine whether an oil pressure sensor has failed, diagnosing of the oil pressure sensor is implemented when a command for supplying oil pressure does not exist before an oil pump is operated after an ignition on time. The ignition being on means an electrical state in which a hybrid vehicle may be driven by power of a motor.

However, when an ignition is turned on again before a predetermined time passes after the ignition is turned off, the oil pressure sensor may detect a pressure over the guaranteed offset error range due to the remaining pressure in the engine clutch, and thus the oil pressure sensor may be determined to have failed in the diagnosing process. In other words, when a soaking time defined by a time from an ignition off time to an ignition on time is shorter than the predetermined time, the oil pressure sensor may detect a pressure over the guaranteed offset error range due to the remaining pressure in the engine clutch.

It is generally known that the predetermined time is a maximum of 5 minutes. Accordingly, when the soaking time is 5 minutes or more, the remaining pressure in the engine clutch is eliminated. In the related art, when the soaking time is less than the predetermined time, the oil pressure sensor may detect remaining pressure in an engine clutch, and thus the pressure sensor may be diagnosed to have failed.

The above information disclosed in this section is only for enhancement of understanding of the background of the invention and therefore it may contain information that does not form the prior art that is already known in this country to a person of ordinary skill in the art.

SUMMARY

The present invention provides a method and a system that diagnoses failure of an oil pressure sensor and has the advantages of preventing an incorrect diagnosis of oil pressure sensor failure by stopping the diagnosis when an ignition is turned on in a state that pressure remains (e.g., a soaking time is less than a predetermined time) in a target device (e.g., an engine clutch) after the ignition is turned off.

An exemplary embodiment of the present invention provides a method of diagnosing failure of an oil pressure sensor that senses oil pressure in a target device, the method including: storing an ignition off time at which an ignition is turned off; detecting an ignition on time at which the ignition is turned on after the ignition has been turned off; calculating an elapsed time from the ignition off time to the ignition on time; determining whether the elapsed time is equal to or greater than a predetermined time; diagnosing failure of the oil pressure sensor when the elapsed time is equal to or greater than the predetermined time; and stopping the diagnosing failure of the oil pressure sensor when the elapsed time is less than the predetermined time.

The ignition off time may be stored using power of a battery. The predetermined time may be set based on a time until the remaining pressure in the target device is eliminated from after the ignition off time. In addition, the target device may be an engine clutch that controls power transmission between an engine and a motor. The elapsed time may be a time until an oil pump supplying pressure to the engine clutch starts to operate from after the ignition off time.

Another embodiment of the present invention provides a system that diagnoses failure of an oil pressure sensor that senses oil pressure in a target device, the system including: an ignition power unit configured to supply electric power to drive a vehicle; an oil pump configured to supply pressure to the target device; a battery configured to supply ordinary power to the system; and a controller configured to diagnose failure of the oil pressure sensor based on time elapsed from an ignition off time.

Specifically, the controller may be operated by a predetermined program, and the predetermined program may include a series of commands that perform a method including: storing an ignition off time that an ignition is turned off; detecting an ignition on time that the ignition is turned on after the ignition has been turned off; calculating an elapsed time from the ignition off time to the ignition on time; determining whether the elapsed time is equal to or greater than a predetermined time; diagnosing failure of the oil pressure sensor when the elapsed time is equal to or greater than the predetermined time; and stopping the diagnosing failure of the oil pressure sensor when the elapsed time is less than the predetermined time.

The controller may include a plurality of units executed by the controller. The plurality of units may include: an ignition off time storing unit configured to store the time that the ignition is turned off; an ignition on time detecting unit configured to detect the ignition on time that the ignition is turned on after the ignition has been turned off; an elapsed time calculating unit configured to calculate an elapsed time from the ignition off time to the ignition on time; and a failure diagnosis performing unit configured to determine whether the elapsed time is equal to or greater than a predetermined time, and configured to stop the diagnosing failure of the oil pressure sensor when the elapsed time is less than the predetermined time.

As described above, according to the exemplary embodiment of the present invention, it may be possible to prevent an incorrect diagnosis of oil pressure sensor failure by stopping the diagnosis of failure of the oil pressure sensor when an ignition turns on in a state when pressure remains (e.g., a soaking time is less than a predetermined time) in a target device (e.g., an engine clutch) after an ignition off time.

Additionally, according to the exemplary embodiment of the present invention, it may be possible to prevent unwanted service due to an incorrect diagnosis of an oil pressure sensor failure.

Further, according to the exemplary embodiment of the present invention, it may be possible to solve a problem that an engine clutch (e.g., a target device) cannot be controlled due to diagnosing an oil pressure sensor as having failed.

DETAILED DESCRIPTION

Figure 1:
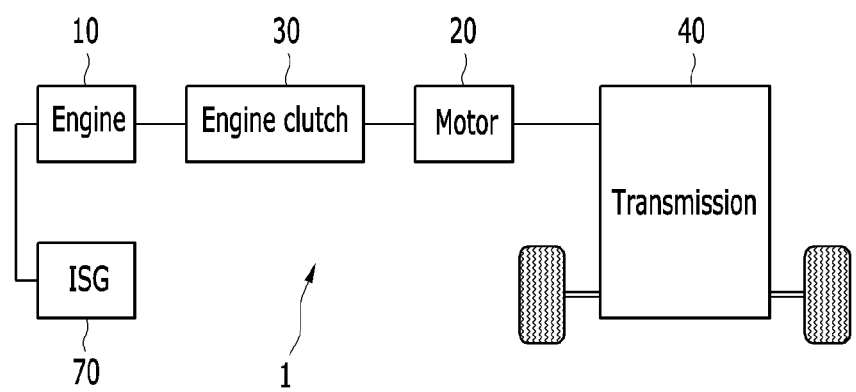
FIG. 1 is an exemplary diagram illustrating a configuration of a general hybrid vehicle according to the related art.
Figure 2:
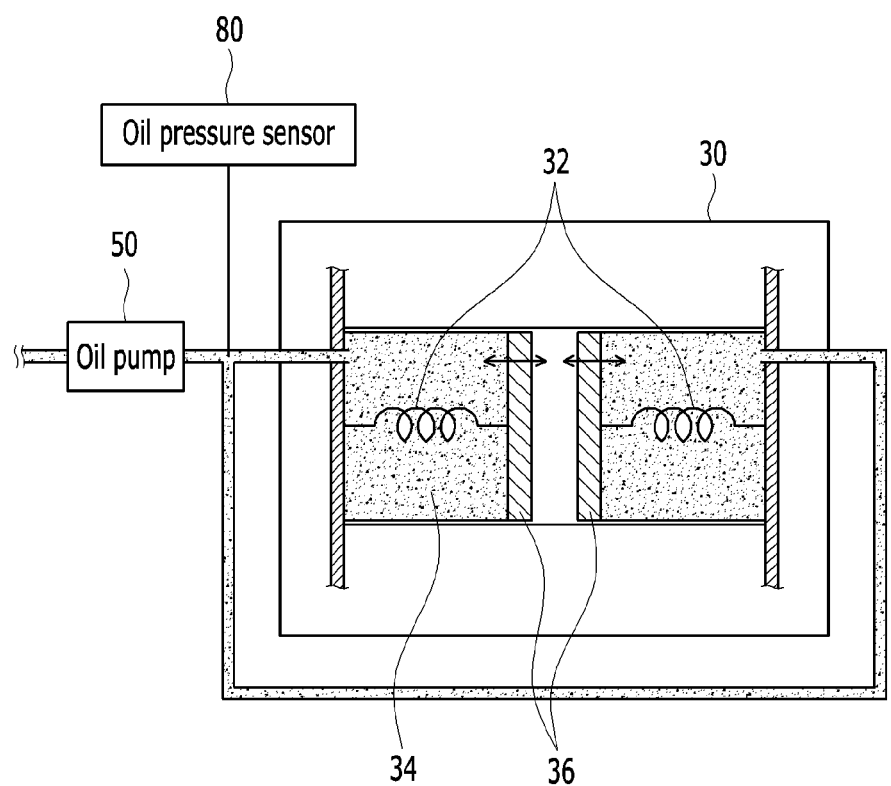
FIG. 2 is an exemplary diagram illustrating a configuration of a general engine clutch According to the related art.
Figure 3:
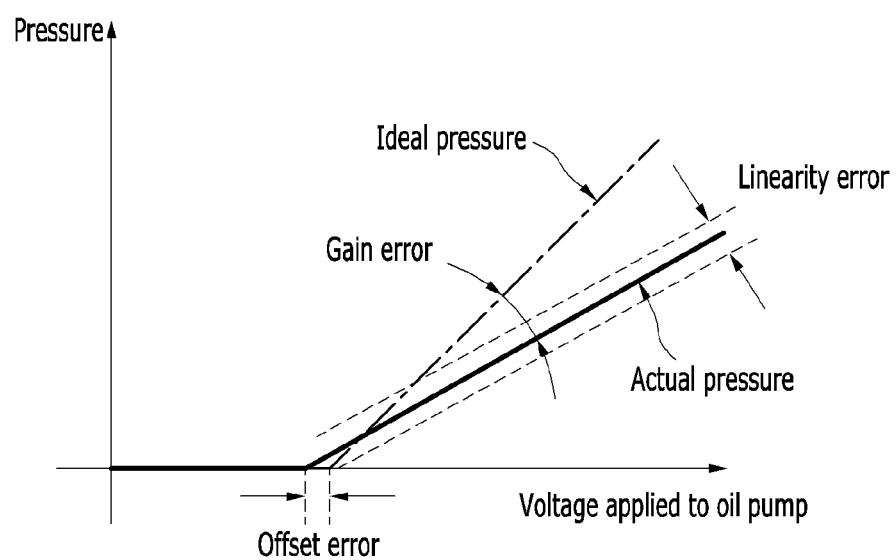
FIG. 3 is an exemplary graph illustrating a difference between an actual pressure and an ideal pressure according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term control unit/controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings. As those skilled in the art would realize, the described embodiments may be modified in various different ways, all without departing from the spirit or scope of the present invention.

Further, throughout the specification, like reference numerals refer to like elements.

Figure 4:
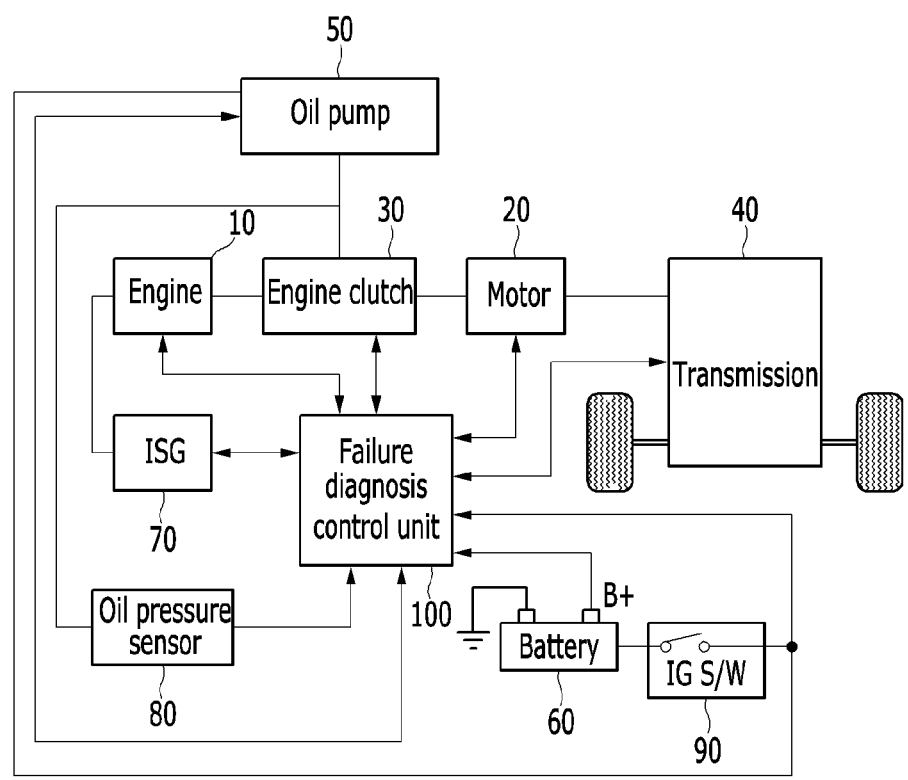
FIG. 4 is an exemplary diagram of a system that diagnoses oil pressure sensor failure according to an exemplary embodiment of the present invention.

FIG. 4 is an exemplary diagram of a system that diagnoses oil pressure sensor failure according to an exemplary embodiment of the present invention. A system that diagnoses oil pressure sensor failure may diagnose failure of an oil pressure sensor that senses or detects operating pressure in a target device (e.g., an engine clutch) using oil pressure.

The system that diagnoses failure of the oil pressure sensor may include an ignition power unit 90 configured to supply electric power to drive a vehicle, an oil pump 50 configured to supply pressure to the target device, a battery 60 configured to supply normal power to the system, and a controller 100 configured to diagnose failure of the oil pressure sensor based on time elapsed from an ignition off time.

In the exemplary embodiment of the present invention, the vehicle may be a hybrid vehicle that includes the target device. In addition, the target device may be a device operated by oil pressure, and for example, may be an engine clutch 30 of the hybrid vehicle. Furthermore, the oil pump 50, the oil pressure sensor 80, the battery 60, and the ignition power unit 90 may be applied to the typical hybrid vehicle.

The controller 100 may include one or more processors or microprocessors and/or hardware operated by a program including a series of commands that execute a method of diagnosing failure of an oil pressure sensor according to an exemplary embodiment of the present invention, which will be described below.

In an exemplary embodiment of the present invention, when the controller 100 is applied to a hybrid vehicle, the controller 100 may include a hybrid control unit (HCU) configured to control operation of the engine clutch 30 and overall operation of the hybrid vehicle, and a battery control unit (BCU) configured to manage and control the battery 60. In the exemplary method of diagnosing failure of the oil pressure sensor according to an exemplary embodiment of the present invention which will be described below, some processes may be performed by the HCU and other processes may be performed by the BMS.

Figure 5:
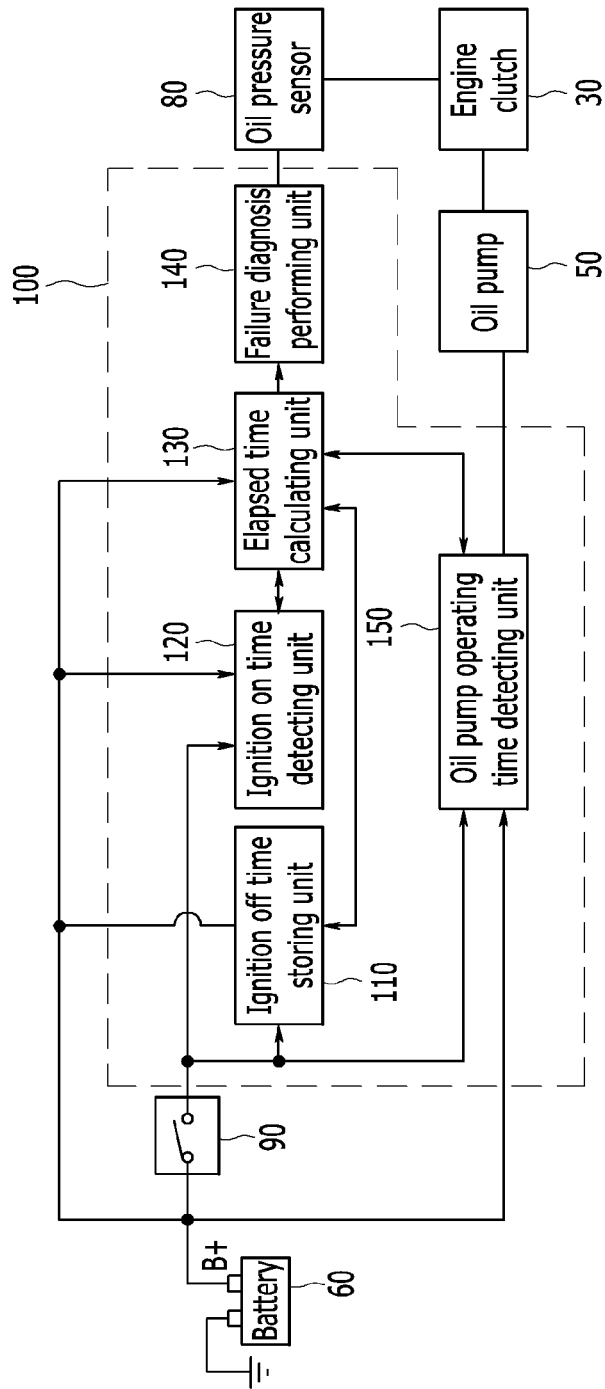
FIG. 5 is an exemplary detailed block diagram of a controller of a system that diagnoses oil pressure sensor failure according to an exemplary embodiment of the present invention.

The controller 100 may include constituent elements as shown in detail in FIG. 5. The detailed constituent elements shown in FIG. 5 may be configured with one or more modules including hardware and software. Referring to FIG. 5, the controller 100 may include a plurality of units executed by the controller. The plurality of units may include an ignition off time storing unit 110 configured to store a time that the ignition has been turned off, an ignition on time detecting unit 120 configured to detect an ignition on time at which the ignition is turned on after the ignition has been turned off, an elapsed time calculating unit 130 configured to calculate an elapsed time (e.g., a soaking time) from the ignition off time to the ignition on time, and a failure diagnosis performing unit 140 configured to determine whether the elapsed time is equal to or greater than a predetermined time and configured to stop diagnosing failure of the oil pressure sensor when the elapsed time is less than the predetermined time. The controller 100 may also include an oil pump operating time detecting unit 150 configured to detect a point in time when the oil pump 50 supplying oil pressure to the engine clutch 30 operates.

The ignition off time storing unit 110 may include a memory configured to store the time at which the ignition is turned off. The elapsed time calculating unit 130 may include a timer that counts the elapsed time. The timer may provide a reference time to the ignition off time storing unit 110, the ignition on time detecting unit 120, and the oil pump operating time detecting unit 150.

Hereinafter, a method of diagnosing failure of an oil pressure sensor according to an exemplary embodiment of the present invention will be described in detail with reference to the accompanying drawings.

In describing the method of diagnosing failure of the oil pressure sensor according to the exemplary embodiment of the present invention, the target device may be an engine clutch of a hybrid vehicle, but it should be understood that the scope of the present invention is not limited thereto. Other configurations to which oil pressure may be substantially supplied by an oil pump and in which oil pressure may be sensed by an oil pressure sensor may be used in the exemplary embodiment of the present invention.

Figure 6:
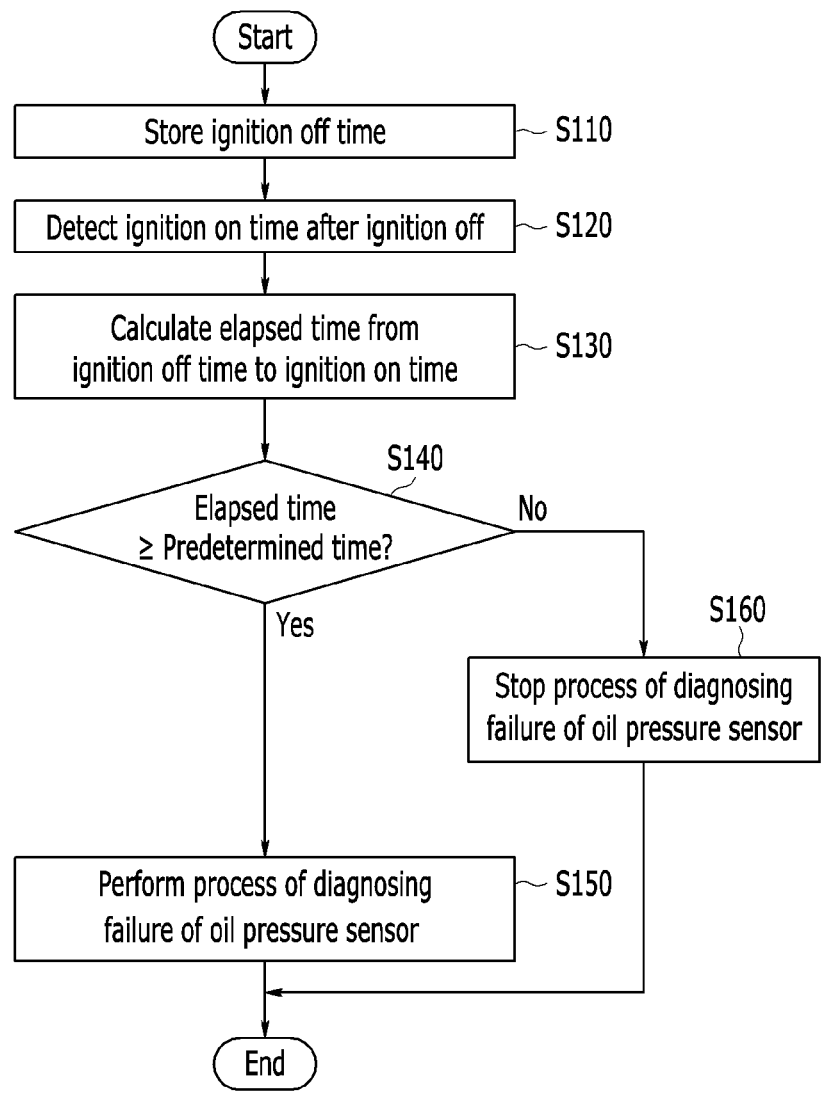
FIG. 6 is an exemplary flowchart of a method of diagnosing oil pressure sensor failure according to an exemplary embodiment of the present invention.

FIG. 6 is an exemplary flowchart of a method of diagnosing failure of an oil pressure sensor according to an exemplary embodiment of the present invention. As illustrated in FIG. 6, when the ignition is turned off, the controller 100 may be configured to store the ignition off time in the ignition off time storing unit 110 (S110). Since the controller 100 is operated by power (B+) of the battery, data of the ignition off time stored in the ignition off time storing unit 110 may be maintained even after the ignition has been turned off.

Furthermore, after the ignition has been turned off, the ignition on time detecting unit 120 of the controller 100 may be configured to detect a point in time when the ignition is turned on (S120). In step S120, when the ignition on time is detected, the elapsed time calculating unit 130 of the controller 100 may be configured to calculate an elapsed time from the ignition off time to the ignition on time (S130). In step S130, when the elapsed time is calculated, the failure diagnosis performing unit 140 of the controller 100 may be configured to determine whether the elapsed time is equal to or greater than a predetermined time (e.g., 5 minutes) (S140).

The predetermined time may be set based on a time until the remaining pressure in the engine clutch is eliminated from after the ignition off time since the remaining pressure in the engine clutch 30 may exist before the predetermined time has elapsed, thus, the oil pressure sensor 80 may be diagnosed as having failed due to the remaining pressure.

In step S140, when the elapsed time is equal to or greater than the predetermined time, the failure diagnosis performing unit 140 of the controller 100 may be configured to diagnose failure of the oil pressure sensor 80 (S150). In addition, when the elapsed time is less than the predetermined time, since the remaining pressure in the engine clutch 30 may exist as described above, the process of diagnosing failure of the oil pressure sensor may stop (S160).

In another exemplary embodiment of the present invention, the oil pump operating time detecting unit 150 of the controller 100 may be configured to detect an operating time of the oil pump 50 independently of detecting the ignition on time. When the operating time of the oil pump 50 has been detected, the elapsed time calculating unit 130 of the controller 100 may be configured to calculate a time elapsed from after the ignition off time to the operating time of the oil pump 50, and the failure diagnosis performing unit 140 of the controller 100 may be configured to determine whether the process of diagnosing failure of the oil pressure sensor 80 proceeds, based on the time. Accordingly, according to the exemplary embodiment of the present invention, it may be possible to diagnose failure of an oil pressure sensor without an error (e.g., with minimal error).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Reference Numerals | |
| --- | --- |
| 30: | Engine clutch |
| 50: | Oil pump |
| 60: | Battery |
| 80: | Oil pressure sensor |
| 90: | Ignition power unit |
| 100: | Failure diagnosis controller |
| 110: | Ignition off time storing unit |
| 120: | Ignition on time detecting unit |
| 130: | Elapsed time calculating unit |
| 140: | Failure diagnosis performing unit |
| 150: | Oil pump operating time detecting unit |

What is claimed is:

1. A method of diagnosing failure of an oil pressure sensor that senses oil pressure in a target device, comprising:

storing, by a controller, an ignition off time at which an ignition is turned off;

detecting, by the controller, an ignition on time at which the ignition is turned on after the ignition has been turned off;

calculating, by the controller, an elapsed time from the ignition off time to the ignition on time;

determining, by the controller, whether the elapsed time is equal to or greater than a predetermined time;

executing a diagnostic routine, by the controller, to detect failure of the oil pressure sensor when the elapsed time is equal to or greater than the predetermined time; and stopping, by the controller, the diagnosing failure of the oil pressure sensor when the elapsed time is less than the predetermined time.

2. The method of claim 1, wherein the ignition off time is stored using power of a battery.

3. The method of claim 1, wherein the predetermined time is set based on a time until remaining pressure in the target device is eliminated from after the ignition off time.

4. The method of claim 1, wherein the target device is an engine clutch that controls power transmission between an engine and a motor.

5. The method of claim 4, wherein the elapsed time is a time until an oil pump that supplies pressure to the engine clutch starts to operate from after the ignition off time.

6. A system that diagnoses failure of an oil pressure sensor that senses oil pressure in a target device, the system comprising:

an ignition power unit configured to supply electric power to drive a vehicle;

an oil pump configured to supply pressure to the target device;

a battery configured to supply ordinary power to the system; and a controller configured to:

store an ignition off time that an ignition is turned off;

detect an ignition on time that the ignition is turned on after the ignition has been turned off;

calculate an elapsed time from the ignition off time to the ignition on time;

determine whether the elapsed time is equal to or greater than a predetermined time;

execute a diagnostic routine to detect failure of the oil pressure sensor when the elapsed time is equal to or greater than the predetermined time; and stop the diagnosing failure of the oil pressure sensor when the elapsed time is less than the predetermined time.

7. The system of claim 6, wherein the ignition off time is stored using power of a battery.

8. The system of claim 6, wherein the predetermined time is set based on a time until remaining pressure in the target device is eliminated from after the ignition off time.

9. The system of claim 6, wherein the target device is an engine clutch that controls power transmission between an engine and a motor.

10. The system of claim 9, wherein the elapsed time is a time until an oil pump that supplies pressure to the engine clutch starts to operate from after the ignition off time.

11. A method of diagnosing failure of an oil pressure sensor that senses oil pressure in a target device, comprising:

storing, by a controller, an ignition off time at which an ignition is turned off;

detecting, by the controller, an ignition on time at which the ignition is turned on after the ignition has been turned off;

calculating, by the controller, an elapsed time from the ignition off time to the ignition on time; and stopping, by the controller, execution of a diagnostic route to detect failure of the oil pressure sensor when the elapsed time is less than the predetermined time.

12. The method of claim 11, wherein the ignition off time is stored using power of a battery.

13. The method of claim 11, wherein the predetermined time is set based on a time until remaining pressure in the target device is eliminated from after the ignition off time.

14. The method of claim 11, wherein the target device is an engine clutch that controls power transmission between an engine and a motor.

15. The method of claim 14, wherein the elapsed time is a time until an oil pump that supplies pressure to the engine clutch starts to operate from after the ignition off time.

* * * * *